United States Patent [19]

Furuta et al.

[11] Patent Number: 5,071,911
[45] Date of Patent: Dec. 10, 1991

[54] THERMOPLASTIC RESIN COMPOSITION AND PROCESS FOR PRODUCING THE SAME

[75] Inventors: Motonobu Furuta; Hiroyuki Harada; Takashi Maruyama, all of Ichihara, Japan

[73] Assignee: Sumitomo Chemical Company, Limited, Osaka, Japan

[21] Appl. No.: 381,255

[22] Filed: Jul. 18, 1989

[30] Foreign Application Priority Data

Jul. 19, 1988 [JP] Japan .................................. 63-180796
Aug. 3, 1988 [JP] Japan .................................. 63-194782

[51] Int. Cl.$^5$ ...................... C08L 51/06; C08L 53/00; C08L 71/12
[52] U.S. Cl. .......................................... 525/68; 525/71; 525/92; 525/148; 525/152; 525/284; 525/285; 525/301; 525/316; 525/322; 525/323; 525/905
[58] Field of Search ................... 525/68, 905, 92, 148, 525/152

[56] References Cited

FOREIGN PATENT DOCUMENTS 52854 6/1982 European Pat. Off. .
142166 5/1985 European Pat. Off. .
0329423 8/1989 European Pat. Off. .
3206637 11/1982 Fed. Rep. of Germany .

Primary Examiner—Jacob Ziegler
Attorney, Agent, or Firm—Birch, Stewart, Kolasch & Birch

[57] ABSTRACT

Disclosed herein is a thermoplastic resin composition which comprises:
(a) a polyphenylene ether resin or a polyphenylene ether-containing resin composition,
(b) a polypropylene grafted with a styrene-based monomer and/or a propylene copolymer grafted with a styrene-based monomer,
(c) an ethylene-α-olefin copolymer grafted with a styrene-based monomer, said ethylene-α-olefin copolymer having a density of 0.85–0.91 g/cm$^3$ and a maximum melting peak temperature of 100° C. and above measured with a differential scanning calorimeter (DSC), and
(d) optionally, rubbery substance. Also disclosed herein is a process for producing a thermoplastic resin composition which comprises incorporating a preblend composed of:
(a') a polyphenylene ether resin or a polyphenylene ether-containing resin composition,
(b') a polypropylene and/or a propylene copolymer,
(c') an ethylene-α-olefin copolymer having a density of 0.85–0.91 g/cm$^3$ and a maximum melting peak temperature of 100° C. and above measured with a differential scanning calorimeter (DSC), and
(d') optionally, a rubbery substance with a styrene-based monomer and an organic peroxide, followed by kneading with heating. The thermoplastic resin composition has good moldability and yields molded articles having well-balanced physical properties.

12 Claims, No Drawings

THERMOPLASTIC RESIN COMPOSITION AND PROCESS FOR PRODUCING THE SAME

BACKGROUND OF THE INVENTION

1. Field of the Invention

The present invention relates to a novel thermoplastic resin composition which can be made into molded articles by injection molding, extrusion molding, or the like, and also to a process for producing the same.

More particularly, the present invention relates to a novel thermoplastic resin composition which is formed by incorporating a polyphenylene ether resin with a polymer obtained by grafting a propylene polymer with a styrene-based monomer and a polymer obtained by grafting a specific ethylene-α-olefin copolymer with a styrene-based monomer. The thermoplastic resin composition is superior in heat resistance, impact resistance, chemical resistance, stiffness, and moldability.

The present invention relates to a process for producing a thermoplastic resin composition superior in heat resistance, impact resistance, chemical resistance, stiffness, and moldability, by incorporating and mixing a polyphenylene ether resin with polypropylene and/or a propylene copolymer, a specific ethylene-α-olefin copolymer, a styrene-based monomer, and an organic peroxide.

2. Prior Art

Polyphenylene ether is generally superior in heat resistance, hot water resistance, dimensional stability, and mechanical and electrical properties. On the other hand, it suffers from the disadvantage of having poor moldability (due to a high melt-viscosity), low chemical resistance, and low impact resistance.

It is known that polyphenylene ether can be improved in moldability through the reduction of melt viscosity without any adverse effect on its superior characteristics, if it is incorporated with a polystyrene resin. However, the resulting composition is still poor in chemical resistance.

Meanwhile, polypropylene and/or propylene copolymers have been in general use as raw materials for molded articles, film, and sheet on account of their outstanding moldability, toughness, water resistance, and chemical resistance, and their low price which is attributable to their low specific gravity.

Unfortunately, polypropylene and/or propylene copolymers have shortcomings or room for improvement in heat resistance, stiffness, impact resistance, coatability, and adhesion properties. This prevents the development of new applications therefor. There is an urgent need for improvement particularly in heat resistance and impact resistance.

It is naturally expected that a resin composition composed of polyphenylene ether and polypropylene and/or propylene copolymer will find new uses if it possesses the features of its components and also has improved moldability and impact resistance.

Contrary to this expectation, a resin composition composed of polyphenylene ether and polypropylene and/or propylene copolymer is of no practical use. It yields injection molded articles in which phase separation takes place between polyphenylene ether and polypropylene due to their poor miscibility. The phase separation makes the molded articles look poor and adversely affects their mechanical properties.

With the forgoing in mind, the present inventors carried out extensive studies to develop a new technology which would lend itself to the improvement of resin compositions composed of polyphenylene ether and propylene polymers and the economical production of such resin compositions. As the result, they completed the present invention.

SUMMARY OF THE INVENTION

Accordingly, it is an object of the present invention to provide a thermoplastic resin composition which comprises:

(a) polyphenylene ether resin or a polyphenylene ether containing resin composition, (b) a polypropylene grafted with a styrene-based monomer and/or a propylene copolymer grafted with a styrene-based monomer, (c) an ethylene-α-olefin copolymer grafted with a styrene based monomer, said ethylene-α-olefin copolymer having a density of 0.85–0.91 g/cm³ and a maximum melting peak temperature of 100° C. and above, as measured with a differential scanning calorimeter (DSC), and (d) optionally, a rubbery substance.

It is another object of the present invention to provide a process for producing a thermoplastic resin composition which comprises incorporating a preblend composed of (a') a polyphenylene ether resin or a polyphenylene ether containing resin composition, (b') a polypropylene and/or a propylene copolymer, (c') an ethylene-α-olefin copolymer having a density of 0.85–0.91 g/cm³ and a maximum melting peak temperature of 100° C. and above measured with a differential scanning, calorimeter (DSC), and (d') optionally, a rubbery substance, with a styrene-based monomer and an organic peroxide and kneading the resulting mixture with heating.

DETAILED DESCRIPTION OF THE INVENTION

The explanation will be made first on the resin composition of the present invention.

The polyphenylene ether used as the component (a) in the present invention is a compound which is formed by the oxidative coupling polymerization of one or more phenols represented by the general formula below.

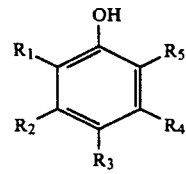

where $R_1$, $R_2$, $R_3$, $R_4$, and $R_5$ each represents hydrogen, a halogen, a hydrocarbon group, a substituted hydrocarbon group, a hydrocarbyloxy group or a substituted hydrocarbyloxy group, wherein at least one of $R_1$-$R_5$ being hydrogen.

Examples of the phenol represented by the general formula above include phenol, o-, m-, or p-cresol, 2,6-, 2,5-, 2,4-, or 3,5-dimethylphenol, 2-methyl-5-phenylphenol, 2,6-diphenylphenol, 2,6-diethylphenol, 2-methyl-6-ethylphenol, 2,3,5-, 2,3,6-, or 2,4,5-trimethylphenol, 3-methyl-6-t-butylphenol, thymol, and 2-metyl-6-arylphenol.

The polyphenylene ether may also be a copolymer of a phenol compound represented by the general formula above and a polyhydroxy aromatic compound, such as bisphenol-A, tetrabromobisphenol-A, resorcinol, hydroquinone, and novolak resin, which are not represented by the general phenol formula above.

The preferred polyphenylene ether is a homopolymer of 2,6-dimethylphenol (2,6-xylenol) or 2,6-diphenylphenol or a copolymer composed of 2,6-xylenol as the major component and 3-methyl-6-t-butylphenol or 2,3,6-trimethylphenol as the minor component.

The oxidative coupling polymerization of the phenol compound is accomplished by the aid of an oxidative coupling catalyst, which is not specifically limited as long as it is capable of polymerization. Typical examples of the catalyst include a combination of a cuprous salt and a tertiary amine (such as cuprous chloride-triethylamine and cuprous chloride-pyridine), a combination of a cupric salt, amine, and alkali metal hydroxide (such as cupric chloride-pyridine-potassium hydroxide), a combination of a manganese salt and a primary amine (such as manganese chloride-ethanolamine and manganese acetate-ethylene-diamine), a combination of a manganese salt and an alcoholate or phenolate (such as manganese chloride-sodium methylate and manganese chloride-sodium phenolate), and a combination of a cobalt salt and a tertiary amine.

The resin composition of the present invention contains the component (b), in which "polypropylene" denotes a propylene homopolymer and "propylene copolymer" denotes a random or block copolymer of propylene with an α-olefin having 2-18 carbon atoms.

The propylene copolymer used for the component (b) includes, for example, ethylene-propylene copolymer, propylene-1-butene copolymer, propylene-1-hexene copolymer, propylene-4-methyl-1-pentene copolymer, and propylene-1-octene copolymer. They may be used alone or in combination with one another. The propylene copolymer should preferably contain more than 70 wt% of propylene.

The component (b) used in the present invention is a polymer formed by grafting polypropylene and/or a propylene copolymer with at least 1 wt%, preferably 2-90 wt%, and more preferably 3-70 wt% of a styrene-based monomer.

The styrene-based monomer is represented by the general formula below.

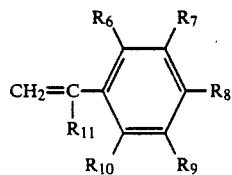

where $R_6$, $R_7$, $R_8$, $R_9$, and $R_{10}$ each represents hydrogen, halogen, a hydrocarbon group a substituted hydrocarbon group, a hydrocarbyloxy group or a substituted hydrocarbyloxy group; and $R_{11}$ represents hydrogen or a lower alkyl group having 1-4 carbon atoms.

Examples of $R_6$, $R_7$, $R_8$, $R_9$, and $R_{10}$ in the general formula above include hydrogen, halogens (such as chlorine, bromine, and iodine), hydrocarbon groups (such as methyl, ethyl, propyl, vinyl, allyl, benzyl, and methylbenzyl), substituted hydrocarbon groups (such as chloromethyl and bromomethyl), and hydrocarbyloxy group or substituted hydrocarbyloxy group (such as methoxy, ethoxy, phenoxy, and monochloromethoxy).

Examples of $R_{11}$ include hydrogen and lower alkyl groups (such as methyl and ethyl).

Examples of the styrene-based monomer include styrene, 2,4-dichlorostyrene, p-methoxystyrene, p-methylstyrene, p-phenylstyrene, p-divinylbenzene, p-(chloromethoxy)-styrene, α-methylstyrene, o-methyl-α-methylstyrene, m-methyl-α-methylstyrene, p-methyl-α-methylstyrene, and p-methoxy-α-methylstyrene. They may be used alone or in combination with one another.

According to the present invention, the component (b) is prepared by grafting polypropylene and/or a propylene copolymer with at least 1 wt% of the styrene-based monomer. This grafting may be accomplished by any known polymerization process such as suspension polymerization, emulsion polymerization, solution polymerization, and bulk polymerization (in a vessel as well as an extruder).

The component (b) in the composition of the present invention may be incorporated with a variety of additives such as heat stabilizer, photostabilizer, antistatic agent, antioxidant, carbon black, pigment, and flame retardant, according to need.

The composition of the present invention contains the component (c) which is formed by grafting an ethylene-α-olefin copolymer having a density of 0.85–0.91 g/cm$^3$ and a maximum melting peak temperature of 100° C. and above, as measured with a differential scanning calorimeter (DSC) (referred to as the component (c') hereinafter) with a styrene-based monomer. The ethylene-α-olefin copolymer denotes a copolymer of ethylene with an α-olefin having 3 or more carbon atoms.

The α-olefin having 3 or more carbon atoms may be of straight chain or branched chain. It includes, for example, propylene, 1-butene, 1-pentene, 1-hexene, 4-methyl-1-pentene, 1-octene, and 1-decene. They may be used in combination with one another. The ethylene-α-olefin copolymer should contain ethylene in an amount of 60 wt% and above, preferably 70 wt% and above, and more preferably 75 wt% and above. In addition, the α-olefin should be one which has 3 to 8 carbon atoms.

The ethylene-α-olefin copolymer as the component (c') should have a density in the range of 0.85 to 0.91 g/cm$^3$ measured according to ASTM D1505 and also have a maximum melting peak temperature of 100° C. and above measured with a differential scanning calorimeter (DSC) by raising the temperature at a rate of 4° C. per minute.

With a density higher than 0.91 g/cm$^3$, the ethylene-α-olefin copolymer affords a resin composition which lacks sufficient impact resistance. With a density lower than 0.85 g/cm$^3$, the ethylene-α-olefin copolymer affords a resin composition which is very poor in heat resistance. Therefore, the ethylene-α-olefin copolymer should preferably have a density in the range of 0.860 to 0.910 g/cm$^3$, more preferably 0.870 to 0.910 g/cm$^3$.

The ethylene-α-olefin copolymer as the component (c') may be obtained by copolymerizing ethylene and an α-olefin in the presence of a Ziegler catalyst, which is composed of an organometallic active component (a hydride or alkyl derivative of Group I–III metals) and a transition metal halide and an optional anhydrous magnesium or manganese compound.

The component (c) in the composition of the present invention is formed by grafting the above-mentioned ethylene-α-olefin copolymer having a density of 0.85–0.91 g/cm$^3$ and a maximum melting peak temperature of 100° C. and above measured with a differential scanning calorimeter (DSC) with a styrene-based monomer in an amount of at least 1 wt%, preferably 2-90 wt%, and more preferably 3-70 wt%. The kind of the styrene-based monomer and the method of grafting are the same as that mentioned above for the grafting of the component (b).

According to an alternative method, the grafting with a styrene-based monomer may be performed on a preblend of the component (b') (polypropylene and/or a propylene copolymer) and the component (c') (an ethylene-α-olefin copolymer having a density of 0.85-0.91 g/cm$^3$ and a maximum melting peak temperature of 100° C. and above measured with (a DSC). The preblending of the components (b') and (c') may be accomplished by the common method employed for blending α-olefin polymers. In other words, the two components both in the form of powder or pellets, or one in the form of powder and the other in the form of pellets, are mixed by means of a Henschel mixer and the resulting dry blend is melt-kneaded by means of a Brabender, roll, Banbury mixer, or granulator.

The resin composition of the present invention may contain the components (a) and (b) in a broad mixing ratio. The amount of the component (a) may range from 2 to 98 wt%, and the amount of the component (b) may range from 98 to 2 wt%. With the component (b) in an amount less than 2 wt%, the resulting composition is not improved in moldability. With the component (b) in an amount more than 98 wt%, the resulting composition is poor in thermal properties such as heat distortion temperature. The preferred amount of the component (a) is 20-80 wt%, and the preferred amount of the component (b) is 80-20 wt%.

According to the present invention, 100 parts by weight of a preblend composed of 98-2 wt% of the component (a) and 2-98 wt% of the component (b) is incorporated with 2-100 parts by weight of the component (c). With the component (c) in an amount less than 2 parts by weight, the resulting resin composition is not so improved in moldability. With the component (c) in an amount more than 100 parts by weight, the resulting resin composition has a low heat distortion temperature.

In the case where the resin composition of the present invention is required to have impact resistance, it may optionally be incorporated with the component (d), which is a rubbery substance or a rubbery substance grafted with a styrene-based monomer.

The "rubbery substance" denotes natural and synthetic polymeric materials which are elastic at room temperature. They include, for example, natural rubber, butadiene polymer, butadiene-styrene copolymer (including random copolymer, block copolymer, and graft copolymer) and hydrogenated products thereof, isoprene polymer, chlorobutadiene polymer, butadiene-acrylonitrile copolymer, isobutylene polymer, isobutylene-butadiene copolymer, isobutylene-isoprene copolymer, acrylic ester copolymer, ethylene-propylene copolymer, ethylene-butene copolymer, ethylene-propylene-styrene copolymer, styrene-isoprene copolymer and hydrogenated products thereof, styrene-butylene copolymer, styrene-ethylene-propylene copolymer, perfluororubber, fluororubber, chloroprene rubber, butyl rubber, silicone rubber, ethylene-propylene-nonconjugated diene copolymer, thiokol rubber, polysulfide rubber, polyurethane rubber, polyether rubber (such as polypropylene oxide), epichlorohydrin rubber, polyester elastomer, and polyamide elastomer.

These rubbery substances may be produced by any process (e.g., emulsion polymerization and solution polymerization) using any catalyst (e.g., peroxide, trialkyl aluminum, lithium halide, and nickel-based catalyst).

Moreover, these rubbery substances may have a varied degree of crosslinking, a varied ratio of microstructure (e.g., cis-structure, trans-structure, and vinyl group), and a varied average rubber particle diameter.

In addition, the above-mentioned copolymers as the rubbery substance may be in the form of a random copolymer, block copolymer, and graft copolymer. These copolymers may also be used in the form of modified products. Examples of the modifier include maleic anhydride, glycidyl methacrylate, and carboxylic acid-containing compounds.

The composition of the present invention may contain at least one type of the above-mentioned rubbery substances (including modified products thereof).

Examples of the ethylene-α-olefin copolymer rubber that can be used in the present invention include copolymers of ethylene with another α-olefin (such as propylene, 1-butene, 1-pentene, 1-hexene, 4-methyl-1-pentene, and 1-octene) and terpolymers (such as ethylene-propylene-1-butene copolymer). Preferable among these are ethylene-propylene copolymer rubber and ethylene-1-butene copolymer rubber.

The copolymer rubber should contain ethylene in an amount of 15-85 wt%, preferably 40-80 wt%. With an ethylene content in excess of 85 wt%, the copolymer rubber has such a high crystalline structure that it is difficult to process under the ordinary rubber molding conditions. With an ethylene content less than 15 wt%, the copolymer rubber has a high glass transition point (Tg), losing some of its rubber properties. A preferred glass transition point is −10° C. or below.

In the case where the rubbery substance is an ethylene-α-olefin-nonconjugated diene copolymer rubber, it should contain the nonconjugated diene in an amount less than 20 wt%. Otherwise, the copolymer rubber will be poor in fluidity due to gelation that takes place at the time of kneading. Preferred examples of the nonconjugated diene include ethylidene norbornene, dicyclopentadiene, and 1,4-hexadiene.

The copolymer rubber should have a number-average molecular weight in the range of 10,000 to 100,000 so that it can be kneaded in an extruder. With an excessively small molecular weight, the copolymer rubber is difficult to handle for the feeding to an extruder. With an excessively high molecular weight, the copolymer rubber has such a low fluidity that it is difficult to process. The copolymer rubber should preferably have a Mooney viscosity ($ML_{1+4}$, 121° C.) of 5 to 120.

The copolymer rubber is not specifically limited in molecular weight distribution. However, it should preferably have a molecular weight distribution expressed in terms of Q value (the weight-average molecular weight divided by the number-average molecular weight) in the range of 1 to 30, desirably 2 to 20.

The modified ethylene-α-olefin copolymer rubber that can be used in the present invention includes an unsaturated dicarboxylic acid-modified ethylene-α-olefin copolymer which is prepared by grafting the above-mentioned ethylene-α-olefin rubber with an unsaturated dicarboxylic acid. Examples of the unsaturated dicarboxylic acid include maleic anhydride, maleic acid, fumaric anhydride, and citraconic anhydride.

The maleic anhydride-modified ethylene-α-olefin copolymer rubber may be prepared by any known method. That is, the ethylene-α-olefin copolymer rubber is reacted with maleic anhydride by the aid of a radical initiator in a hydrocarbon solvent at 60°-150° C. for several minutes to several hours, to give a solution containing the modified rubber. If necessary, the solution may be incorporated with an alcohol or amine to convert the maleic anhydride into a half ester or half amide, respectively. The resulting solution is poured into a large amount of methanol or acetone to recover the desired modified rubber.

Alternatively, the modified copolymer rubber may also be obtained by mixing the ethylene-α-olefin copolymer rubber together with maleic anhydride and a radical initiator in an extruder. For example, the modified copolymer rubber may be obtained by mixing 100 parts by weight of rubber, 0.5-15 parts by weight of maleic anhydride, and 0.005-1.0 part by weight of radical initiator at 150°-300° C. for several minutes to several tens of minutes. If necessary, a phenol-based antioxidant such as 2 6-di-t-butyl-4-hydroxytoluene (BHT) may be added to prevent the gelation which would otherwise occur during mixing.

The rubbery substance that can be used in the present invention includes a variety of modified ethylene-α-olefin copolymer rubbers in which the modifier is a monomeric compound selected from methyl acrylate, methyl methacrylate, allyl glycidyl ether, and glycidyl methacrylate. These monomeric compounds may be used in combination with one another.

The ethylene-α-olefin copolymer rubber may be used in combination with one or more than one type of the modified ethylene-α-olefin copolymer rubbers.

The ethylene-α-olefin copolymer rubber grafted with a styrene-based monomer may be prepared by not only the above-mentioned process but also the following process. That is, an ethylene-α-olefin copolymer rubber in the form of small chips or pellets is dispersed into pure water together with a dispersing agent. Subsequently, the copolymer rubber is impregnated with a styrene-based monomer, and the reaction is performed by the aid of a radical initiator at 50°-150° C. for 1-5 hours. Thus there is obtained a grafted ethylene-α-olefin copolymer rubber.

The rubbery substance as the component (c) in the composition of the present invention is not specifically limited in amount. However, a preferred amount is in the range of not exceeding 50 parts by weight for 100 parts by weight of the total amount of the components (a), (b), and (c). With an amount in excess of 50 parts by weight, the rubbery substance weakens the inherent outstanding properties of polyphenylene ether.

The thermoplastic resin composition of the present invention may be incorporated with other polymeric compounds. They include polyolefins (such as polymethylpentene); homopolymers and copolymers of vinyl compounds (such as polyvinyl chloride, polymethyl methacrylate, polyvinyl acetate, polyvinyl pyridine, polyvinyl carbazole, polyacrylamide, polyacrylonitrile, ethylene-vinyl acetate copolymer, and alkenyl aromatic resins); polycarbonate, polysulfone, polyethylene terephthalate, polybutylene terephthalate, polyarylene ester (such as U-polymer made by Unitika Co., Ltd.), polyphenylene sulfide; polyamides (such as nylon-6, nylon-66, and nylon-12), and condensation polymers (such as polyacetal). Additional examples of the polymeric compounds include thermosetting resins such as silicone resin, fluorocarbon resin, polyimide, polyamideimide, phenolic resin, alkyd resin, unsaturated polyester resin, epoxy resin, and diallyl phthalate resin. Preferable among them are polyolefins, polyamides, alkenyl aromatic resins, and rubber-modified alkenyl aromatic resins. Alkenyl aromatic resins are most desirable.

The thermoplastic resin composition of the present invention may also be incorporated with a reinforcing agent (such as glass fiber and carbon fiber), inorganic and organic filler (such as carbon black, silica, and $TiO_2$), plasticizer, stabilizer, flame retardant, dye, and pigment.

The reinforcing agent is added to improve the mechanical properties (such as flexural strength, flexural modulus, tensile strength, and tensile modulus) and thermal properties (such as heat distortion temperature) of the resin composition. Examples of the reinforcing agent include alumina fiber, carbon fiber, glass fiber, high modulus polyamide fiber, high modulus polyester fiber, silicon carbide fiber, and titanate whisker.

The reinforcing agent should be used in an amount enough to produce the reinforcing effect. The preferred amount is in the range of 5 to 100 parts by weight for 100 parts by weight of the resin composition.

The particularly preferred reinforcing filler is glass fiber filaments made of lime-aluminum borosilicate glass containing only a limited amount of sodium (known as "Σ" glass). In the case where electric properties are not so important, glass fiber filaments made of low-sodium glass, known as "C" glass may also be useful. The filaments can be produced by the conventional process such as air blowing, flame blowing, and mechanical drawing. The filaments desirable for plastics reinforcement can be produced by mechanical drawing. The filaments made by this process have a diameter in the range of 2 to 20 μm. The filament diameter is not so critical in the present invention. The filament length and form are not so critical either. The glass filaments may be used in the form of roving, thread, rope, or mat. Glass filaments in the form of strand cut to 0.3-3 cm, preferably 0.6 cm and below, are convenient to use in the preparation of the resin composition of the present invention.

The flame retardant useful for the resin composition of the present invention includes a group of compounds known to those skilled in the art. Particularly important among them are those which contain a specific element such as bromine, chlorine, antimony, phosphorus, and nitrogen, which produces flame retardance. Examples of the flame retardant include halogenated organic compounds, antimony oxide, a mixture of antimony oxide and halogenated organic compound, a mixture of antimony oxide and phosphorus compound, phosphorus (as a simple substance), phosphorus compounds, and a mixture of halogen-containing compound and phosphorus compound or a compound having the phosphorus-nitrogen bond. They may be used in combination with one another.

The flame retardant should be used in an amount enough to impart flame retardance to the resin composition, although the amount is not so critical. When used in an excessive amount, the flame retardant will deteriorate the physical properties of the resin composition, resulting in, for example, the lowering of the softening point. Therefore, the flame retardant should be used in an amount of 0.5-50 parts by weight, preferably 1-25 parts by weight, and more preferably 3-15 parts by weight, for 100 parts by weight of polyphenylene ether or a polyphenylene ether-containing resin composition.

The useful halogen-containing compounds are represented by the general formula below.

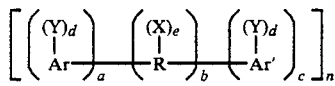

where n is 1 to 10; R denotes a group selected from the group consisting of alkylene (such as methylene, ethylene, propylene, isopropylene, butylene, and isobutylene), alkylidene (such as isopropylidene and amylene), alicyclic linkage (such as cyclohexylene and cyclopentylidene), ether, carbonyl, amine, sulfur-containing linkage (such as sulfide, sulfoxide, and sulfone), carbonate, and phosphorus-containing linkage.

R may also denotes a group formed by connecting two or more alkylene or alkylidene groups through an aromatic linkage, amino linkage, ether linkage, ester linkage, carbonyl linkage, sulfide linkage, sulfoxide linkage, sulfone linkage, or phosphorus-containing linkage. Ar and Ar' each denotes a monocyclic or polycyclic carbocyclic aromatic residue such as phenylene, biphenylene, perphenylene, and naphthylene. Ar and Ar, may be the same or different.

Y denotes a substituent group selected from the group consisting of organic groups, inorganic groups, and organometallic groups. Examples of Y include (1) halogen (such as chlorine, bromine, iodine, and fluorine), (2) ether group represented by the general formula of OE (where E denotes a monovalent hydrocarbon group as defined by X below), (3) —OH group, (4) monovalent hydrocarbon group, and (5) other substituent groups (such as nitro group and cyano group). When d is 2 or above, the substituent groups represented by Y may be the same or different.

X denotes a monovalent hydrocarbon group such as those listed below. Alkyl groups (such as methyl, ethyl, propyl, isopropyl, butyl, and decyl); aryl groups (such as phenyl, naphthyl, biphenyl, xylyl, and tolyl); aralkyl groups (such as benzyl and ethylphenyl); alicyclic groups (such as cyclopentyl and cyclohexyl); and monovalent hydrocarbon groups containing an inert substituent group. When there are two or more substituent groups represented by X, they may be the same or different.

The subscript d denotes an integer ranging from 1 to a number determined by the maximum number of substitutable hydrogen atoms on the aromatic ring represented by Ar or Ar'. The subscript e denotes 0 or an integer ranging from 1 to a number determined by the maximum number of substitutable hydrogen atoms on the group represented by R. The subscripts a, b, and c each denotes 0 or an integer. Unless b is 0, neither a nor c is 0; otherwise. When b is 0, the aromatic groups are connected to each other directly through a carbon-carbon bond. The aromatic groups Ar and Ar, may have hydroxyl groups or substituent groups Y on any of the ortho, meta, and para positions. Examples of the compound represented by the general formula above include the following.

2,2-bis-(3,5-dichlorophenyl)-propane,
bis-(2-chlorophenyl)-methane,
1,2-bis-(2,6-dichlorophenyl)-ethane,
1,1,-bis-(4-iodophenyl)-ethane,
1,1-bis-(2-chloro-4-iodophenyl)-ethane,
1,1-bis-(2-chloro-4-methylphehyl)-ethane,
1,1-bis-(3,5-dichlorophenyl)-ethane,
2,2-bis-(3-phenyl-4-bromophenyl)-ethane,
2,3-bis-(4,6-dichloronaphthyl)-propane,
2,2-bis-(2,6-dichlorophenyl)-pentane,
2,2-bis-(3,5-dichlorophenyl)-hexane,
bis-(4-chlorophenyl)-phenylmethane,
bis-(3,5-dichlorophenyl)-cyclohexylmethane,
bis-(3-nitro-4-bromophenyl)-methane,
bis-(4-oxy-2,6-dichloro-3-methoxyphenyl)-methane,
2,2-bis-(3,5-dibromo-4-oxyphenyl)-propane,
2,2-bis-(3,5-dichloro-4-oxyphenyl)-propane, and
2,2-bis-(3-bromo-4-oxyphenyl)-propane.

Additional examples include bis-aromatic compounds in which the two aliphatic groups in the above-mentioned compounds are replaced by sulfide groups or sulfoxy groups, and also include the following compounds.

Tetrabromobenzene, hexachlorobenzene, hexabromobenzene, 2,2'-dichlorobiphenyl, 2,4'-dibromobiphenyl, 2,4'-di-chlorobiphenyl, hexabromobiphenyl, octabromobiphenyl, decabromobiphenyl, halogenated diphenyl ether containing 2-10 halogen atoms, and oligomers having a degree of polymerization of 1 to 20 which are formed by polymerizing 2,2-bis-(3,5-dibromo-4-oxyphenyl)-propane and phosgene.

The halogenated compounds that can be advantageously used in the present invention include aromatic halogenated compounds (such as chlorinated benzene, brominated benzene, chlorinated biphenyl, chlorinated terphenyl, brominated biphenyl, and brominated terphenyl); compounds containing two phenyl nuclei separated by a divalent alkylene group, each of said phenyl nuclei having at least two chlorine or bromine atoms; and mixtures thereof. Preferable among these are hexabromobenzene, chlorinated biphenyl or terphenyl, and a mixture thereof with antimony oxide.

The typical phosphoric compound that can be advantageously used as a flame retardant in the present invention is one which is represented by the general formula below and a nitrogen analog thereof.

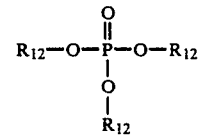

where each $R_{12}$ denotes an identical or different hydrocarbon group (such as alkyl, cycloalkyl, aryl, alkyl-substituted aryl, and aryl-substituted alkyl); halogen; hydrogen; or a combination thereof.

Adequate examples of the phosphoric ester include the following. Phenyl bisdodecyl phosphate, phenyl bisneopentyl phosphate, phenyl ethylene hydrogen phosphate, phenyl bis-(3,5,5'-trimethylhexyl) phosphate, ethyl diphenyl phosphate, 2-ethylhexyl di-(p-tolyl) phosphate, diphenyl hydrogen phosphate, bis-(2-ethylhexyl) p-tolyl phosphate, tritolyl phosphate, bis-(2-ethylhexyl) phenyl phosphate, tri(nonylphenyl) phosphate, phenyl methyl hydrogen phosphate, di(dodecyl) p-tolyl phosphate, triphenyl phosphate, halogenated triphenyl phosphate, dibutyl phenyl phosphate, 2-chloroethyl diphenyl phosphate, p-tolyl bis-(2,5,5'-trimethylhexyl) phosphate, 2-ethylhexyl diphenyl phosphate, and diphenyl hydrogen phosphate. Preferable among them is triphenyl phosphate. It is also desirable to use triphenyl phosphate in combination with hexabromobenzene or antimony oxide.

Other flame retardants that can be used in the present invention include compounds having a phosphorus-nitrogen bond, such as phosphorus nitride chloride, phosphoric ester amide, phosphoric acid amide, phosphonic acid amide, tris(aziridinyl) phosphine oxide, and tetrakis(hydroxymethyl) phosphonium chloride.

The present invention does not pose any restrictions on the process for producing the resin composition of the present invention, and it permits the use of any known conventional process. The mixing of the resin components may be accomplished by dissolution in a solvent, followed by recovery from the solution after solvent evaporation or precipitation in a non-solvent. In the commercial production, however, the mixing of the resin components is usually performed in their molten state. The melt-kneading can be carried out with an ordinary single-screw extruder, twin-screw extruder, or kneader. A twin-screw extruder of high shear stress type is preferable.

It is desirable to uniformly mix the resin components in the powder or pellet form using a tumbler or Henschel mixer, prior to melt-kneading. However, this preliminary mixing may be omitted, and the individual components may be directly metered to the mixing machine.

The resin composition obtained by the melt-kneading is ready for molding such as injection molding and extrusion molding. However, the scope of the present invention covers the process which does not involve the preliminary mixing step. In this case, the individual components are dry-blended and the resulting dry blend undergoes injection molding or extrusion molding in which the components are directly melted and mixed.

The resin composition of the present invention can be advantageously produced according to the process of the present invention which comprises incorporating a styrene-based monomer and an organic peroxide into a preblend composed of (a') polyphenylene ether resin or a polyphenylene ether-containing resin composition,
(b') polypropylene and/or a propylene copolymer,
(c') an ethylene-α-olefin copolymer having a density of 0.85-0.91 g/cm³ and a maximum melting peak temperature of 100° C. and above measured with a differential scanning calorimeter (DSC), and
(d') optionally, a rubbery substance,
and heating and kneading the resulting mixture.

The polyphenylene ether used as the component (a') in the process of the present invention is a compound which is formed by the oxidative coupling polymerization of one or more than one type of phenol represented by the general formula below.

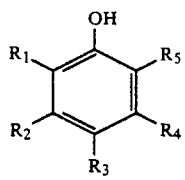

where $R_1$, $R_2$, $R_3$, $R_4$, and $R_5$ each represents hydrogen, a halogen, a hydrocarbon group, a substituted hydrocarbon group, a hydrocarbyloxy group or a substituted hydrocarbyloxy group, wherein at least one of $R_1$–$R_5$ being hydrogen.

Examples of the phenols represented by the general formula above include phenol, o-, m-, or p-cresol, 2,6-, 2,5-, 2,4-, or 3,5-dimethylphenol, 2-methyl-5-phenylphenol, 2,6-diphenylphenol, 2,6-diethylphenol, 2-methyl-6-ethylphenol, 2,3,5-, 2,3,6-, or 2,4,5-trimethylphenol, 3-methyl-6-t-butylphenol, thymol, and 2-metyl-6-arylphenol.

The polyphenylene ether may also be a copolymer of a phenol compound represented by the general formula above and a polyhydroxy aromatic compound, such as bisphenol-A, tetrabromobisphenol-A, resorcinol, hydroquinon, and novolak resins, which are not represented by the general phenol formula above.

The preferred polyphenylene ether is a homopolymer of 2,6-dimethylphenol or 2,6-diphenylphenol or a copolymer composed of 2,6-xylenol as the major component and 3-methyl-6-t-butylphenol or 2,3,6-trimethylphenol as the minor component.

The oxidative coupling polymerization of the phenol compound is accomplished by the aid of an oxidative coupling catalyst, which is not specifically limited as long as it is capable of polymerization. Typical examples of the catalyst include a combination of a cuprous salt and a tertiary amine (such as cuprous chloride-triethylamine and cuprous chloride-pyridine), a combination of a cupric salt, amine, and alkali metal hydroxide (such as cupric chloride-pyridine-potassium hydroxide), a combination of a manganese salt and a primary amine (such as manganese chloride-ethanolamine and manganese acetate-ethylene-diamine), a combination of a manganese salt and an alcholate or phenolate (such as manganese chloride-sodium methylate and manganese chloride-sodium phenolate), and a combination of a cobalt salt and a tertiary amine.

The component (b') used in the process of the present invention is polypropylene and/or a propylene copolymer. The polypropylene denotes a propylene homopolymer and the propylene copolymer denotes a random or block copolymer of propylene with an α-olefin having 2–18 carbon atoms.

Examples of the propylene copolymer include ethylenepropylene copolymer, propylene-1-butene copolymer, propylene-1-hexene copolymer, propylene-4-methyl-1-pentene copolymer, and propylene-1-octene copolymer. They may be used alone or in combination with one another.

The component (c') used in the present invention is an ethylene-α-olefin copolymer which is a copolymer of ethylene with an α-olefin having 3 or more carbon atoms. The α-olefin having 3 or more carbon atoms may be of straight chain or branched chain. It includes, for example, propylene, 1-butene, 1-pentene, 1-hexene, 4-methyl-1-pentene, 1-octene, and 1-decene. They may be used in combination with one another. Preferred α-olefins are those which have 3 to 8 carbon atoms.

The ethylene-α-olefin copolymer as the component (c') should have a density in the range of 0.85 to 0.91 g/cm³ measured according to ASTM D1505 and also have a maximum melting peak temperature of 100° C. and above measured with a differential scanning calorimeter (DSC) by raising the temperature at a rate of 4° C. per minute.

With a density higher than 0.91 g/cm³, the ethylene-α-olefin copolymer as the component (c') affords a resin composition which lacks sufficient impact resistance. With a density lower than 0.85 g/cm³, the ethylene-α- olefin copolymer affords a resin composition which is very poor in heat resistance. With a maximum peak temperature lower than 100° C., the ethylene-α-olefin copolymer affords a resin composition which is poor in heat resistance.

The ethylene-α-olefin copolymer as the component (c') may be obtained by copolymerizing ethylene and an α-olefin in the presence of a Ziegler catalyst, which is composed of an organometallic active component (a hydride or alkyl derivative of Group I–III metals) and a transition metal halide and an optional anhydrous magnesium or manganese compound.

The styrene-based monomer used in the process of the present invention is represented by the general formula below.

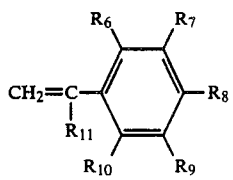

where $R_6$, $R_7$, $R_8$, $R_9$, and $R_{10}$ each represents a hydrogen, halogen, hydrocarbon group, or substituted hydrocarbon group, and hydrocarbyloxy group or substituted hydrocarbyloxy group; and $R_{11}$ represents hydrogen or a lower alkyl group having 1–4 carbon atoms.

Examples of $R_6$, $R_7$, $R_8$, $R_9$, and $R_{10}$ in the general formula above include hydrogen, halogens (such as chlorine, bromine, and iodine), hydrocarbon groups (such as methyl, ethyl, propyl, vinyl, allyl, benzyl, and methylbenzyl), substituted hydrocarbon groups (such as chloromethyl and bromomethyl), and hydrocarbyloxy group or substituted hydrocarbyloxy group (such as methoxy, ethoxy, phenoxy, and monochloromethoxy). Examples of $R_{11}$ include hydrogen and lower alkyl groups (such as methyl and ethyl).

Examples of the styrene-based monomer include styrene, 2,4-dichlorostyrene, p-methoxystyrene, p-methylstyrene, p-phenylstyrene, p-divinylbenzene, p-(chloromethoxy)-styrene, α-methylstyrene, o-methyl-α-methylstyrene, m-methyl-α-methylstyrene, p-methyl-α-methylstyrene, and p-methoxy-α-methylstyrene. They may be used alone or in combination with one another.

According to the process of the present invention, the resin components are mixed together with a styrene-based monomer and an organic peroxide. During mixing, the organic peroxide causes the styrene-based monomer to graft onto the propylene polymer as the component (b') and the ethylene-α-olefin copolymer as the component (c'). The grafted components are more miscible with the polyphenylene ether as the component (a') than the original ones. Thus the resulting resin composition is improved in heat resistance and impact resistance.

The organic peroxide that can be used in the present invention is not specifically limited. An organic peroxide that is acceptable may be selected according to the kneading temperature and other factors.

Examples of the organic peroxide include mono-t-butyl permaleate, succinic acid peroxide, p-menthane peroxide, 2,5-dimethylhexyl peroxide, di-t-butyl peroxide, t-butylcumyl peroxide, dicymyl peroxide, α,α'-bis(t-butyl peroxy)-p-diisopropylbenzene, 2,5-dimethyl-2,5-di-(t-butyl peroxy)-hexane, 2,5-dimethyl-2,5-di-(t-butyl peroxy)-hexene-3, acetyl peroxide, propionyl peroxide, t-butyl peroxy-2-ethyl hexanoate, t-butyl peroxy-3,5,5-trimethyl hexanoate, t-butyl peroxylaurate, t-butyl peroxybenzoate, di-t-butyl di-peroxy-phthalate, 2,5-dimethyl-2,5-di-(benzoyl peroxy)-hexane, t-butyl peroxymaleic acid, and t-butyl peroxyisopropyl carbonate. They may be used alone or in combination with one another.

The process of the present invention does not pose any restriction on the apparatus used for mixing the resin components, and it permits the use of any conventional mixing apparatus.

The melt-kneading can be carried out with an ordinary single-screw extruder, twin-screw extruder, or kneader. A twin-screw extruder of high shear stress type is preferable.

It is desirable to uniformly mix the resin components in the powder or pellet form using a tumbler or Henschel mixer, prior to melt-kneading. However, this preliminary mixing may be omitted, and the individual components may be directly metered to the mixing machine.

The styrene-based monomer may be previously mixed with any one or two of the components (a'), (b'), and (c'), or may be fed alone to the mixing apparatus.

The melt-kneading should be performed at 180°–350° C. The uniform mixing of the resin components is difficult to perform at temperatures below 180° C.; and the decomposition of the resin components takes place during mixing at a temperature above 350° C.

The process of the present invention does not pose any restrictions on the sequence and frequency of mixing the components (a'), (b'), and (c') with the styrene-based monomer.

Thus, one possible way involves the steps of incorporating the component (a') with the styrene-base monomer, followed by kneading, and incorporating the kneaded product with the components (b') and (c'), followed by kneading again. An alternative way involves the steps of blending the components (b') and (c'), followed by kneading, incorporating the blend with the styrene-base monomer, followed by kneading, and incorporating the kneaded product with the component (a'), followed by kneading again.

According to the process of the present invention, the preblend may be composed of the components (a) and (b), with the former component ranging from 2 to 98 wt% and the latter component ranging from 98 to 2 wt%. With the component (b) less than 2 wt%, the resulting resin composition is not so improved in moldability. With the component (b) in excess of 98 wt%, the resulting resin composition is poor in thermal properties such as heat distortion temperature. The preferred amount of the component (a) is 20–80 wt%, and the preferred amount of the component (b) is 80–20 wt%.

According to the process of the present invention, 100 parts by weight of a preblend composed of 98–2 wt% of the component (a') and 2–98 wt% of the component (b') is incorporated with 2–100 parts by weight of the component (c'). With the component (c') in an amount less than 2 parts by weight, the resulting resin composition is not so improved in moldability. With the component (c') in an amount more than 100 parts by weight, the resulting resin composition has a low heat distortion temperature.

According to the process of the present invention, 100 parts by weight of a preblend composed of the components (a'), (b'), and (c') is incorporated with 1-100 parts by weight, preferably 2-50 parts by weight, of the styrene-based monomer to give the thermoplastic resin composition. With the styrene-based monomer in an amount less than 1 part by weight, the resulting resin composition is very poor in heat resistance and impact resistance. With the styrene-based monomer in an amount more than 100 parts by weight, the resulting resin composition is poor in chemical resistance and heat resistance.

According to the process of the present invention, 0.01-5 parts by weight of an organic peroxide is used for 100 parts by weight of the styrene-based monomer. With an amount less than 0.01 parts by weight, the organic peroxide does not bring about the grafting reaction completely; with an amount in excess of 5 parts by weight, the organic peroxide causes the discoloration and gelation of the resin composition.

In the case where the resin composition of the present invention is required to have impact resistance, it may optionally be incorporated with the component (d′), which is a rubbery substance or a rubbery substance grafted with a styrene-based monomer.

The "rubbery substance" denotes natural and synthetic polymeric materials which are elastic at room temperature. They include, for example, natural rubber, butadiene polymer, butadiene-styrene copolymer (including random copolymer, block copolymer, and graft copolymer) and hydrogenated products thereof, isoprene polymer, chlorobutadiene polymer, butadiene-acrylonitrile copolymer, isobutylene polymer, isobutylene-butadiene copolymer, isobutylene-isoprene copolymer, acrylic ester copolymer, ethylene-propylene copolymer, ethylene-butene copolymer, ethylene-propylene-styrene copolymer, styrene-isoprene copolymer and hydrogenated products thereof, styrene-butylene copolymer, styrene-ethylene-propylene copolymer, perfluororubber, fluororubber, chloroprene rubber, butyl rubber, silicone rubber, ethylene-propylene-nonconjugated diene copolymer, thiokol rubber, polysulfide rubber, polyurethane rubber, polyether rubber (such as polypropylene oxide), epichlorohydrin rubber, polyester elastomer, and polyamide elastomer.

These rubbery substances may be produced by any process (e.g., emulsion polymerization and solution polymerization) using any catalyst (e.g., peroxide, trialkyl aluminum, lithium halide, and nickel-based catalyst).

Moreover, these rubbery substances may have a varied degree of crosslinking, a varied ratio of microstructure (e.g., cis-structure, trans-structure, and vinyl group), and a varied average rubber particle diameter.

In addition, the above-mentioned copolymers as the rubbery substance may be in the form of random copolymer, block copolymer, and graft copolymer. These copolymers may also be used in the form of modified products. The composition of the present invention may contain at least one type of the above-mentioned rubbery substances (including modified products thereof). A preferred example of the rubbery substances is an ethylene-α-olefin copolymer rubber or a modified product thereof.

Examples of the ethylene-α-olefin copolymer rubber that can be used in the process of the present invention include copolymers of ethylene with another α-olefin (such as propylene, 1-butene, 1-pentene, 1-hexene, 4-methyl-1-pentene, and 1-octene) and terpolymers (such as ethylene-propylene-1-butene copolymer). Preferable among them are ethylene-propylene copolymer rubber and ethylene-1-butene copolymer rubber.

The copolymer rubber should contain ethylene in an amount of 15-85 wt%, preferably 40-80 wt%. With an ethylene content in excess of 85 wt%, the copolymer rubber has such a high crystalline structure that it is difficult to process under the ordinary rubber molding conditions. With an ethylene content less than 15 wt%, the copolymer rubber has a high glass transition point (Tg), losing some of its rubber properties. A preferred glass transition point is $-10°$ C. or below.

In the case where the rubbery substance is an ethylene-α-olefin-nonconjugated diene copolymer rubber, it should contain the nonconjugated diene in an amount less than 20 wt%. Otherwise, the copolymer rubber will be poor in fluidity due to gelation that takes place at the time of kneading. Preferred examples of the nonconjugated diene include ethylidene norbornene, dicyclopentadiene, and 1,4-hexadiene.

The copolymer rubber should have a number-average molecular weight in the range of 10,000 to 100,000 so that it can be kneaded in an extruder. With an excessively small molecular weight, the copolymer rubber is difficult to handle for the feeding to an extruder. With an excessively high molecular weight, the copolymer rubber has such a low fluidity that it is difficult to process. The copolymer rubber should preferably have a Mooney viscosity ($ML_{1+4}$, 121° C.) of 5 to 120.

The copolymer rubber is not specifically limited in molecular weight distribution. However, it should preferably have a molecular weight distribution expressed in terms of Q value (the weight-average molecular weight divided by the number-average molecular weight) in the range of 1 to 30, desirably 2 to 20.

The modified ethylene-α-olefin copolymer rubber that can be used in the present invention includes an unsaturated dicarboxylic acid-modified ethylene-α-olefin copolymer which is prepared by grafting the above-mentioned ethylene-α-olefin rubber with an unsaturated dicarboxylic acid. Examples of the unsaturated dicarboxylic acid include maleic anhydride, maleic acid, fumaric anhydride, and citraconic anhydride.

The maleic anhydride-modified ethylene-α-olefin copolymer rubber may be prepared by any known method. That is, the ethylene-α-olefin copolymer rubber is reacted with maleic anhydride by the aid of a radical initiator in a hydrocarbon solvent at 60°-150° C. for several minutes to several hours, to give a solution containing the modified rubber. If necessary, the solution may be incorporated with an alcohol or amine to convert the maleic anhydride into a half ester or half amide, respectively. The resulting solution is poured into a large amount of methanol or acetone to recover the desired modified rubber.

Alternatively, the modified copolymer rubber may also be obtained by mixing the ethylene-α-olefin copolymer rubber together with maleic anhydride and a radical initiator in an extruder. For example, the modified copolymer rubber may be obtained by mixing 100 parts by weight of rubber, 0.5-15 parts by weight of maleic anhydride, and 0.005-1.0 parts by weight of radical initiator at 150°-300° C. for several minutes to several tens of minutes. If necessary, a phenol-based antioxidant such as 2,6-di-t-butyl-4-hydroxytoluene (BHT) may be added to prevent the gelation which would otherwise occur during mixing.

The rubbery substance that can be used in the process of the present invention includes a variety of modified ethylene-α-olefin copolymer rubbers in which the modifier is a monomeric compound selected from methyl acrylate, methyl methacrylate, allyl glycidyl ether, and glycidyl methacrylate. These monomeric compounds may be used in combination with one another.

The ethylene-α-olefin copolymer rubber may be used in combination with one or more than one type of the modified ethylene-α-olefin copolymer rubbers.

The ethylene-α-olefin copolymer rubber grafted with a styrene-based monomer may be prepared by not only the above-mentioned process but also the following process. That is, an ethylene-α-olefin copolymer rubber in the form of small chips or pellets is dispersed into pure water together with a dispersing agent. Subsequently, the copolymer rubber is impregnated with a styrene-based monomer, and the reaction is performed by the aid of a radical initiator at 50°-150° C. for 1-5 hours. Thus there is obtained a grafted ethylene-α-olefin copolymer rubber.

The amount of the rubbery substance should preferably be in the range of not exceeding 50 parts by weight for 100 parts by weight of the total amount of the components (a'), (b'), and (c'). With an amount in excess of 50 parts by weight, the rubbery substance weakens the inherent outstanding properties of polyphenylene ether.

The process of the present invention does not pose any restrictions on the sequence and frequency of mixing the rubbery substance (d'), the components (a'), (b'), and (c'), and the styrene-based monomer.

Thus, one possible way involves the steps of incorporating the components (a'), (b'), and (c') with the rubbery substance (d'), and further incorporating the resulting mixture with the styrene-based monomer, followed by kneading. An alternative way involves the steps of incorporating the components (a'), (b'), and (c') with the styrene-based monomer, and further incorporating the resulting mixture with the rubbery substance (d'), followed by kneading.

According to the present invention, the components (a'), (b'), and (c') may be incorporated with other polymeric compounds. They include polyolefins (such as polyethylene and polymethylpentene); homopolymers and copolymers of vinyl compounds (such as polyvinyl chloride, polymethyl methacrylate, polyvinyl acetate, polyvinyl pyridine, polyvinyl carbazole, polyacrylamide, polyacrylonitrile, ethylene-vinyl acetate copolymer, and alkenyl aromatic resins); polycarbonate, polysulfone, polyethylene terephthalate, polybutylene terephthalate, polyarylene ester (such as U-polymer made by Unitika Co., Ltd.), polyphenylene sulfide; polyamides (such as nylon-6, nylon-66, and nylon-12), and condensation polymers (such as polyacetal). Additional examples of the polymeric compounds include thermosetting resins such as silicone resin, fluorocarbon resin, polyimide, polyamideimide, phenolic resin, alkyd resin, unsaturated polyester resin, epoxy resin, and diallyl phthalate resin. Preferable among them are polyolefins, polyamides, alkenyl aromatic resin, and rubber-modified alkenyl aromatic resins. Alkenyl aromatic resins are most desirable.

The thermoplastic resin composition of the present invention may also be incorporated with a reinforcing agent (such as glass fiber and carbon fiber), inorganic and organic filler (such as carbon black, silica, and $TiO_2$), plasticizer, stabilizer, flame retardant, dye, and pigment.

The reinforcing agent is added to improve the mechanical properties (such as flexural strength, flexural modulus, tensile strength, and tensile modulus) and thermal properties (such as heat distortion temperature) of the resin composition. Examples of the reinforcing agent include alumina fiber, carbon fiber, glass fiber, high modulus polyamide fiber, high modulus polyester fiber, silicon carbide fiber, and titanate whisker.

The resin composition of the present invention can be made into molded articles, sheet, tubing, film, fiber, laminates, coating materials, and the like by injection molding and extrusion molding. The molded articles will find use as automotive parts and interior and exterior such as bumper, instrument panel, fender, trim, door panel, wheel cover, side protector, garnish, trunk lid, hood, and roof. The molded articles will also find use as machine parts which need heat resistance. Other possible uses include motorcycle parts (such as covering material, muffler cover, and leg shield), electric and electronic parts (such as housing, chasis, connector, printed circuit board, and pulley), and other parts which all need strength and heat resistance.

EXAMPLES

The invention will be described in more detail with reference to the following examples, which are not intended to limit the scope of the invention. In the examples, the deflection temperature under load (heat distortion temperature) is measured according to JIS K7202; the Izod impact strength (3.2 mm thick) is measured according to JIS K7110; the flexural modulus is measured according to ASTM D790-66 for a 5.0 mm thick specimen press-molded according to JIS K6758; the maximum melting peak temperature is measured using a differential scanning calorimeter (DSC) at a heating rate of 4° C./min; and the reduced viscosity ($\eta$ sp/c) of polyphenylene ether is measured for a 0.5 g/dl chloroform solution at 25° C.

EXAMPLES 1 to 4 AND COMPARATIVE EXAMPLES 1 to 4

(1) Preparation of component (b) (styrene-grafted propylene copolymer)

In a 100-liter autoclave are placed 10 kg of commercial polypropylene pellets having an MI of 3.0 ("Sumitomo Noblen AH561" made by Sumitomo Chemical Co., Ltd.), 40 liters of water, 3 kg of styrene monomer, 60 g of dispersing agent ("Metholose 90SH-100"), and peroxide ("Perbutyl PV"). The reaction is carried out at 120° C. for about 1 hour, during which nitrogen is continuously blown through the autoclave. After cooling, the reaction mixture is extracted with methyl ethyl ketone to remove polystyrene, and then the styrene-grafted propylene copolymer is recovered. It contains 1.8 kg of styrene which has grafted onto the propylene copolymer. The rate of graft polymerization is 60%, which is calculated according to the following formula.

$$\text{Rate of graft polymerization (\%)} = \frac{Gw - Pw}{Mw} \times 100$$

where

Mw : the weight of styrene monomer charged,
Gw : the weight of grafted polymer, and
Pw : the weight of propylene copolymer charged.

(2) Preparation of component (c) (styrene-grafted ethylene-α-olefin copolymer)

In a 100-liter autoclave are placed 10 kg of commercial ethylene-α-olefin copolymer pellets having a density of 0.88 g/cm³ and a maximum melting peak temperature of 113° C. ("Sumitomo Excelen CN1007" made by Sumitomo Chemical Co., Ltd.), 40 liters of water, 3 kg of styrene monomer, 60 g of dispersing agent ("Metholose 90SH-100"), and peroxide ("Perbutyl PV"). The reaction is carried out at 120° C. for about 1 hour, during which nitrogen is continuously blown through the autoclave. After cooling, the reaction mixture is extracted with methyl ethyl ketone to remove polystyrene, and then the styrene-grafted ethylene-α-olefin copolymer is recovered.

The same procedure as above is repeated to prepare a styrene-grafted polymer form "Sumitomo Excelen CN1003" having a density of 0.90 g/cm³ and a maximum melting peak temperature of 118° C. (made by Sumitomo Chemical Co., Ltd.).

The thus prepared styrene-grafted propylene copolymer and styrene-grafted ethylene-α-olefin copolymer are kneaded together with polyphenylene ether at 270° C. using a labo-plastomill (made by Toyo Seiki Co., Ltd.) The resulting composition is made into test pieces by compression molding. The test pieces are tested for physical properties. The formulation and physical properties of the resin composition are shown in Table 1.

In comparative examples, the same procedure as mentioned above is repeated except that the styrene-grafted propylene copolymer is replaced by an unmodified propylene copolymer or the styrene-grafted ethylene-α-olefin copolymer is replaced by high-density polyethylene. It is noted that the resin compositions in Examples are greatly improved in physical properties.

EXAMPLES 5 TO 8 AND COMPARATIVE EXAMPLES 5 to 8

(1) Preparation of styrene-grafted propylene copolymer

A styrene-grafted propylene copolymer is prepared in the same manner as in Examples 1 to 4, except that "Sumitomo Noblen AH561" is replaced by "Sumitomo Noblen AW564" (made by Sumitomo Chemical Co., Ltd.) having an MI of 9.0. The propylene copolymer is grafted with 1.9 kg of styrene. The rate of graft polymerization of 63%.

(2) Preparation of ethylene-1-hexene copolymer

A 2-liter autoclave reactor equipped with a stirrer is continuously charged with ethylene and 1-hexene in such a ratio that the concentration of 1-hexene is 50 mol%. Copolymerization is carried out at 220° C. and 1100 kg/cm², by the aid of Ziegler catalyst and 0.1 mol% of hydrogen. Thus there is obtained the ethylene-1-hexene copolymer.

The catalyst is composed of trioctyl aluminum (as the active ingredient) and a compound represented by the formula $TiCl_3 \cdot \frac{1}{3}AlCl_3 \cdot 6MgCl_2$, with the atomic ratio of Al/Ti being 3.

The resulting copolymer has a density of 0.90 g/cm³ and a maximum melting peak temperature of 112° C.

The component (a) is polyphenylene ether (PPE) having an η sp/c of 0.50, made by Nippon Polyether Co., Ltd.

The component (b) is the styrene-grafted propylene copolymer prepared as mentioned above.

The component (c) is prepared in the same manner as Examples 1 to 4 by grafting styrene onto "Sumitomo Excelen CN1007" (ethylene-α-olefin copolymer) or the ethylene-1-hexene prepared as mentioned above.

The component (d) is "Sumitomo Esprene E201" having a Mooney viscosity $ML_{1+4}$ (121° C.) of 27 (made by Sumitomo Chemical Co., Ltd.).

The formulation and physical properties of the resulting resin compositions are shown in Table 2.

It is noted that the styrene-grafted ethylene-60-olefin copolymer greatly improves the physical properties of the resin composition.

EXAMPLES 9 TO 16 AND COMPARATIVE EXAMPLES 9 AND 10

(1) Preparation of styrene-grafted ethylene-propylene copolymer rubber

A stainless steel autoclave equipped with a stirrer are charged with 100 parts by weight of "Esprene E-201" as ethylene-α-olefin copolymer rubber in the form of chips (EPM, $ML_{1+4}$ 121° C.=27, ethylene content=47 wt%, Tg=−64° C., made by Sumitomo Chemical Co., Ltd.), 350 parts by weight of pure water, 4.0 parts by weight of calcium tertiary phosphate, and 4.0 parts by weight of "Prulonic F-68" (made by Asahi Denka Kogyo Co., Ltd.). The atmosphere in the autoclave is completely replaced with nitrogen with stirring.

To the autoclave are further added 30 parts by weight of styrene monomer and 0.75 parts by weight of "Sunperox TO" (made by Sanken Kako Co., Ltd.) as a radical initiator. The reactants are heated to 110° C. over 80 minutes. The reaction is carried out for 1 hour. After cooling, the reaction product is filtered to separate the styrene-grafted copolymer rubber, which is subsequently thoroughly washed with pure water and dried in a vacuum. The copolymer rubber contains 25 wt% of styrene according to infrared spectrometry and has a Mooney viscosity ($ML_{1+4}$ 121° C.) of 53 and a Tg of −58° C.

The resin composition of the present invention is prepared by mixing (1) polyphenylene ether having an η sp/c of 0.46 (PPE made by Nippon Polyether Co., Ltd.), (2) a styrene-grafted propylene copolymer (obtained in Examples 5 to 9), (3) a styrene-grafted α-olefin copolymer (obtained in Examples 6 and 7), and (4) a rubbery substance (styrene-grafted EPR prepared as mentioned above).

Table 3 shows the formulations and physical properties of the resin compositions. It is noted that the styrene-grafted α-olefin copolymer contributes to the great improvement in physical properties.

EXAMPLES 17 AND 18 AND COMPARATIVE EXAMPLES 11 AND 12

(1) Preparation of styrene-grafted propylene copolymer and ethylene-α-olefin copolymer A commercial polypropylene block copolymer ("Sumitomo Noblen AW564" made by Sumitomo Chemical Co., Ltd.) and a commercial ethylene-α-olefin copolymer having a density of 0.90 g/cm³ and a maximum melting peak temperature of 114° C. ("Sumitomo Excelen CN1001" made by Sumitomo Chemical Co., Ltd.) at a ratio of 80:20 by weight. The mixture is pelletized and the pellets are subjected to styrene-grafting in the following manner.

The pellets (1 kg) are placed in a 10-liter autoclave together with 4 liters of water, 300 g of styrene monomer, 6 g of dispersing agent ("Metholose 90 SH-100"), and peroxide ("Perbutyl PV"). The reaction is carried out at 120° C. for about 1 hour, during which nitrogen is continuously blown through the autoclave. After cooling, the reaction mixture is extracted with methyl ethyl ketone to remove polystyrene, and then the styrene-grafted polymer composition is recovered.

The resin composition of the present invention is prepared according to the formulation shown in Table 4 by mixing (1) polyphenylene ether having an η sp/c of 0.53 (PPE made by Nippon Polyether Co., Ltd.), (2) a styrene-grafted propylene copolymer and ethylene-α-olefin copolymer (prepared as mentioned above), (3) a styrene-grafted EPR (the same one as used in Example 10). The resulting resin compositions are tested for physical properties. The results are shown in Table 4.

It is noted that the styrene-grafted composition of propylene copolymer and ethylene-α-olefin copolymer contributes to great improvement in the impact strength of the resin composition.

EXAMPLE 19 AND COMPARATIVE EXAMPLE 13

(1) Preparation of impact-resistant polystyrene

An impact-resistant polystyrene is prepared by mixing 80 wt% of polystyrene ("Esbrite 8" made by Sumitomo Chemical Co., Ltd.) and 20 wt% of polybutadiene ("Diene 35A" made by Asahi Chemical Industry Co., Ltd.) under the same conditions as in Examples 1 to 4.

The resin composition of the present invention is prepared in the same manner as in Examples 1 to 4 according to the formulation shown in Table 5 by mixing (1) polyphenylene ether having an η sp/c of 0.53 (PPE made by Nippon Polyether Co., Ltd.), (2) a styrene-grafted propylene (the same one as used in Example 5 to 8), (3) an ethylene-α-olefin copolymer (the same one as used in Examples 9 to 16), (4) a styrene-grafted EPR (the same one as used in Example 9), and (5) an impact-resistant polystyrene prepared as mentioned above. The resulting resin compositions are tested for chemical resistance and physical properties. The results are shown in Table 5.

The chemical resistance is evaluated by dipping a test piece in methyl ethyl ketone at 25° C. for 200 hours, followed by drying in a vacuum, and measuring the weight loss that takes place after dipping.

It is noted from Table 5 that the impact-resistant polystyrene contributes less than styrene-grafted polypropylene or styrene-grafted EPR to the improvement in chemical resistance and physical properties.

TABLE 1

| Example No. (Comparative Example No.) | Formulation (parts by weight) | | | | | Physical properties | |
|---|---|---|---|---|---|---|---|
| | Polyphenylene ether[*1] | Polypropylene[*2] | Styrene-grafted propylene copolymer[*3] | Styrene-grafted ethylene-α-olefin copolymer | Polyethylene[*4] | Izod impact resistance (with notch, kg · cm/cm) | Deflection temperature under load (4.6 kg/cm$^2$, °C.) |
| 1 | 46 | 0 | 54 | 8[*5] | 0 | 7 | 143 |
| 2 | 46 | 0 | 54 | 16[*5] | 0 | 10 | 135 |
| 3 | 55 | 0 | 45 | 8[*5] | 0 | 5 | 150 |
| 4 | 46 | 0 | 54 | 8[*6] | 0 | 6 | 145 |
| (1) | 46 | 54 | 0 | 8[*5] | 0 | 3 | 92 |
| (2) | 46 | 54 | 0 | 8[*7] | 0 | 2 | 90 |
| (3) | 46 | 0 | 54 | 0 | 0 | 2 | 148 |
| (4) | 46 | 0 | 54 | 0 | 8 | 3 | 136 |

[*1]PPE (η sp/c = 0.48) made by Nippon Polyether Co., Ltd.
[*2]"Sumitomo Noblen AH561" (MI = 3.0) made by Sumitomo Chemical Co., Ltd.
[*3]Styrene grafted product of "Sumitomo Noblen AH561"
[*4]High-density polyethylene "110J" (0.96 g/cm$^3$) made by Idemitsu Petrochemical Co., Ltd.
[*5]Styrene-grafted product of "Sumitomo Excelen CN1007" (0.88 g/cm$^3$) made by Sumitomo Chemical Co., Ltd.
[*6]Styrene-grafted product of "Sumitomo Excelen CN1003" (0.90 g/cm$^3$) made by Sumitomo Chemical Co., Ltd.
[*7]"Sumitomo Excelen CN1007" (not grafted)

TABLE 2

| Example No. (Comparative Example No.) | Formulation (parts by weight) | | | | | Physical properties | |
|---|---|---|---|---|---|---|---|
| | Polyphenylene ether[*1] | Styrene-grafted polypropylene copolymer[*2] | Ethylene α-olefin copolymer | Styrene-grafted ethylene α-olefin copolymer | Rubbery substance[*3] | Izod impact resistance (with notch, kg · cm/cm) R.T.  −30° C. | Deflection temperature under load (4.6 kg/cm$^2$, °C.) |
| 5 | 50 | 50 | 0 | 10[*4] | 0 | 8  6 | 142 |
| (5) | 50 | 50 | 10[*5] | 0 | 0 | 4  2 | 131 |
| 6 | 50 | 50 | 0 | 10[*6] | 7 | 14  9 | 133 |
| (6) | 50 | 50 | 10[*7] | 0 | 7 | 6  3 | 115 |
| 7 | 39 | 53 | 0 | 12[*6] | 9 | 14  11 | 139 |
| 8 | 39 | 53 | 0 | 12[*7] | 9 | 16  12 | 142 |
| (7) | 39 | 53 | 0 | 0 | 9 | 4  2 | 147 |
| (8) | 39 | 53 | 12[*8] | 0 | 9 | 6  3 | 138 |

[*1]PPE (η sp/c = 0.50) made by Nippon Polyether Co., Ltd.
[*2]Styrene-grafted product of "Sumitomo Noblen AH564" (MI = 9.0) made by Sumitomo Chemical Co., Ltd.
[*3]"Sumitomo Esprene E201" (ML$_{1+4}$ 121° C. = 27) made by Sumitomo Chemical Co., Ltd.
[*4]Styrene-grafted product of "Sumitomo Excelen CN1007" (0.88 g/cm$^3$) made by Sumitomo Chemical Co., Ltd.
[*5]"Sumitomo Excelen CN1007"
[*6]Styrene-grafted product of ethylene-1-hexene copolymer (0.90 g/cm$^3$) (trial product)
[*7]Ethylene-1-hexene copolymer (0.90 g/cm$^3$) (trial product)
[*8]"Sumikathene G401" (0.93 g/cm$^3$) made by Sumitomo Chemical Co., Ltd.

TABLE 3

| Example No. (Comparative Example No.) | Formulation (parts by weight) | | | | Physical properties | | |
|---|---|---|---|---|---|---|---|
| | Polyphenyl- ene ether[*1] | Styrene-grafted polypropylene copolymer[*2] | Styrene-grafted α-olefin copolymer[*3] | Rubbery substance | Izod impact resistance (with notch, kg · cm/cm) | | Deflection temperature under load (4.6 kg/cm$^2$, °C.) |
| 9 | 34 | 66 | 8 | 13 EPR[*4] | R.T. 23 | −30° C. 15 | 136 |
| 10 | 34 | 66 | 8 | 13 EPDM[*5] | 12 | 9 | 123 |
| 11 | 34 | 66 | 8 | 13 SBR[*6] | 13 | 9 | 118 |
| 12 | 34 | 66 | 8 | 13 PB[*7] | 15 | 11 | 115 |
| 13 | 34 | 66 | 8 | 13[*8] | 32 | 21 | 85 |
| 14 | 34 | 66 | 8 | 13[*9] | 29 | 19 | 93 |
| 15 | 34 | 66 | 8 | 13[*10] | 11 | 8 | 120 |
| 16 | 34 | 66 | 8 | 13[*11] | 12 | 8 | 128 |
| (9) | 34 | 66 | 0 | 13 PB[*7] | 7 | 3 | 86 |
| (10) | 34 | 66 | 0 | 13[*8] | 9 | 4 | 91 |

[*1]PPE (η sp/c = 0.46) made by Nippon Polyether Co., Ltd.
[*2]Styrene-grafted product of "Sumitomo Noblen AW564" made by Sumitomo Chemical Co., Ltd.
[*3]Styrene-grafted product of "Sumitomo Excelen CN1001" (0.90 g/cm$^3$) made by Sumitomo Chemical Co., Ltd.
[*4]Styrene-grafted product of "Sumitomo Esprene E201" made by Sumitomo Chemical Co., Ltd.
[*5]"Sumitomo Esprene E306" (ML$_{1+4}$ 121° C. = 60) made by Sumitomo Chemical Co., Ltd.
[*6]"Sumitomo SBR 1507" made by Sumitomo Chemical Co., Ltd.
[*7]"Diene 35A" made by Asahi Chemical Industry Co., Ltd.
[*8]"Craton GX-1701" (styrene-ethylene-propylene block copolymer) made by Shell Chemical Co., Ltd.
[*9]"Craton D-1101" (styrene-butadiene block copolymer) made by Shell Chemical Co., Ltd.
[*10]"Dailark 232" (styrene-maleic anhydride copolmyer) made by Arco Co., Ltd.
[*11]"Sumitomo Evatate 2021" (ethylene-vinyl acetate copolymer containing 10% vinyl acetate) made by Sumitomo Chemical Co., Ltd.

TABLE 4

| Example No. (Comparative Example No.) | Formulation (parts by weight) | | | | Physical properties | | |
|---|---|---|---|---|---|---|---|
| | Polyphenyl- ene ether[*1] | polyprop- ylene[*2] | Styrene-grafted (propylene copolymer/ ethylene-α-olefin copolymer)[*3] | Rubbery substance[*4] | Izod impact resistance (with notch, kg · cm/cm) | | Deflection temperature under load (4.6 kg/cm$^2$, °C.) |
| 17 | 43 | 0 | 57 | 0 | R.T. 29 | −30° C. 22 | 142 |
| 18 | 43 | 0 | 57 | 12 | 38 | 26 | 131 |
| (11) | 43 | 57 | 0 | 0 | 4 | 2 | 132 |
| (12) | 43 | 57 | 0 | 12 | 9 | 4 | 127 |

[*1]PPE (η sp/c = 0.53) made by Nippon Polyether Co., Ltd.
[*2]"Sumitomo Noblen AW564" (MI = 9.0) made by Sumitomo Chemical Co., Ltd.
[*3]Styrene-grafted product (in pellet form) of an 80/20 mixture of "Sumitomo Noblen AW564" and "Sumitomo Excelen CN1001" made by Sumitomo Chemical Co., Ltd.
[*4]Styrene-grafted product of "Sumitomo Esprene E201".

TABLE 5

| Example No. (Comparative Example No.) | Formulation (parts by weight) | | | | | Physical properties | | |
|---|---|---|---|---|---|---|---|---|
| | Polyphenyl- ene ether[*1] | Styrene- grafted propylene copolymer[*2] | Impact- resistant Polystyrene[*3] | Styrene-grafted ethylene-α-olefin copolymer[*4] | Styrene- grafted EPR[*5] | Chemical resistance (weight loss %)[*6] | Deflection temperature under load (4.6 kg/cm$^2$, °C.) | Izod impact resistance (with notch, kg · cm/cm at R.T.) |
| 19 | 40 | 40 | 0 | 10 | 10 | <0.1 | 129 | 23 |
| (13) | 40 | 0 | 50 | 10 | 0 | 2.3 | 123 | 15 |

[*1]PPE (η sp/c = 0.50) made by Nippon Polyether Co., Ltd.
[*2]Styrene-grafted product of "Sumitomo Noblen AW564" (MI = 9.0) made by Sumitomo Chemical Co., Ltd.
[*3]Polystyrene containing 20 wt % of polybutadiene
[*4]Styrene-grafted product of "Sumitomo Excelen CN1001"
[*5]Styrene-grafted product of "Sumitomo Esprene E201 "
[*6]Weight loss after dipping in methyl ethyl ketone at 20° C. for 200 hours

EXAMPLES 20 AND 21

The resin compositions are prepared by kneading polyphenylene ether, polypropylene, ethylene-α-olefin copolymer, styrene, and organic peroxide all at once at 270° C. according to the formulation shown in Table 6 using a labo-plastomill (made by Toyo Seiki Co., Ltd.). The polyphenylene ether is PPE (η sp/c=0.42) made by Nippon Polyether Co., Ltd. The polypropylene is "Sumitomo Noblen AW564" (MI=9.0) made by Sumitomo Chemical Co., Ltd. The ethylene-α-olefin copolymer is "Sumitomo Excelen CN1003" (ethylene-butene copolymer having a density of 0.90 g/cm$^3$ and a maximum melting peak temperature of 118° C.) made by Sumitomo Chemical Co., Ltd. The styrene is reagent grade one available from Wako Junyaku Co., Ltd. The organic peroxide is "Sanperox TO" made by Sanken Kako Co., Ltd. The amount of the organic peroxide is 2 parts by weight for 100 parts by weight of the styrene.

The resin compositions are tested for physical properties. The results are shown in Table 6.

COMPARATIVE EXAMPLES 14 TO 17

The same procedure as in Example 20 is repeated, except that the styrene is not added (in Comparative Examples 14 and 15) or the ethylene-α-olefin copolymer is replaced by high-density polyethylene or low-density polyethylene (in Comparative Examples 16 and 17). The results are shown in Table 6. It is noted that the resulting resin compositions are poor in physical properties.

EXAMPLES 22 TO 27 AND COMPARATIVE EXAMPLES 18 AND 19

(1) Preparation of styrene-modified ethylene-propylene rubber (rubbery substance)

A stainless steel autoclave equipped with a stirrer are charged with 100 parts by weight of "Esprene E-201" as ethylene-α-olefin copolymer rubber in the form of chips (EPM containing 47 wt% of ethylene, made by Sumitomo Chemical Co., Ltd.), 350 parts by weight of pure water, 4.0 parts by weight of calcium tertiary phosphate, and 4.0 parts by weight of "Prulonic F-68" (made by Asahi Denka Kogyo Co., Ltd. The atmosphere in the autoclave is completely replaced with nitrogen with stirring.

To the autoclave are further added 20 parts by weight of styrene monomer and 0.75 parts by weight of "Sunperox TO" (made by Sanken Kako Co., Ltd.) as a radical initiator. The reactants are heated to 110° C. over 90 minutes. The reaction is carried out for 1 hour. After cooling, the reaction product is filtered to separate the modified copolymer rubber, which is subsequently thoroughly washed with pure water and dried in a vacuum. The thus obtained copolymer rubber contains 16 wt% of styrene according to infrared spectrometry.

The resin compositions are prepared by kneading polyphenylene ether, polypropylene, ethylene-α-olefin copolymer, styrene, rubbery substance, and organic peroxide all at once according to the formulation shown in Table 7 in the same manner as in Examples 20 and 21. The polyphenylene ether is PPE ($\eta$ sp/c=0.38) made by Nippon Polyether Co., Ltd. The polypropylene is "Sumitomo Noblen AY564" (MI=15) made by Sumitomo Chemical Co., Ltd. The ethylene-α-olefin copolymer is "Sumitomo Excelen CN1001" (ethylene-butene copolymer having a density of 0.90 g/cm$^3$ and a maximum melting peak temperature of 114° C.) made by Sumitomo Chemical Co., Ltd. The amounts of the styrene and organic peroxide are the same as in Examples 13 and 14.

The resin compositions are tested for physical properties. The results are shown in Table 7. It is noted that the incorporation of styrene contributes to the great improvement in physical properties.

TABLE 6

| Example No. (Comparative Example No.) | Polyphenylene ether[1] | Polypropylene[2] | ethylene-α-olefin copolymer[3] | Polyethylene | Styrene | Organic peroxide (for 100 parts by weight of styrene) | Izod impact resistance (with notch, kg · cm/cm) | Deflection temperature under load (4.6 kg/cm$^2$, °C.) |
|---|---|---|---|---|---|---|---|---|
| 20   | 27 | 60 | 13 | 0      | 5  | 2 | 11 | 118 |
| 21   | 27 | 60 | 13 | 0      | 10 | 2 | 13 | 123 |
| (14) | 27 | 60 | 0  | 0      | 0  | 0 | 2  | 98  |
| (15) | 27 | 60 | 13 | 0      | 0  | 0 | 6  | 111 |
| (16) | 27 | 60 | 0  | 13[4]  | 5  | 2 | 4  | 113 |
| (17) | 27 | 60 | 0  | 13[5]  | 5  | 2 | 3  | 112 |

[1]PPE ($\eta$ sp/c = 0.42) made by Nippon Polyether Co., Ltd.
[2]"Sumitomo Noblen AW564" (MI = 9.0) made by Sumitomo Chemical Co., Ltd.
[3]"Sumitomo Excelen CN1003" (0.90 g/cm$^3$) made by Sumitomo Chemical Co., Ltd.
[4]High-density polyethylene "110J" (0.96 g/cm$^3$) made by Idemitsu Petrochemical Co., Ltd.
[5]"Sumikathene G401" (high-pressure low-density polyethylene, 0.93 g/cm$^3$) made by Sumitomo Chemical Co., Ltd.

TABLE 7

| Example No. (Comparative Example No.) | Polyphenylene ether[1] | Polypropylene[2] | ethylene-α-olefin copolymer[3] | Rubbery substance | Styrene | Organic peroxide (for 100 parts by weight of styrene) | Izod impact resistance (with notch, kg · cm/cm) | Deflection temperature under load (4.6 kg/cm$^2$, °C.) |
|---|---|---|---|---|---|---|---|---|
| 22   | 38 | 52 | 10 | 0      | 10 | 2 | 9  | 126 |
| 23   | 38 | 52 | 10 | 0      | 25 | 2 | 11 | 130 |
| (18) | 38 | 52 | 10 | 0      | 0  | 0 | 5  | 113 |
| 24   | 38 | 52 | 10 | 15[4]  | 10 | 2 | 11 | 116 |
| 25   | 38 | 52 | 10 | 15[5]  | 10 | 2 | 19 | 108 |
| 26   | 38 | 52 | 10 | 15[6]  | 10 | 2 | 17 | 117 |
| 27   | 38 | 52 | 10 | 15[7]  | 10 | 2 | 10 | 110 |
| (19) | 38 | 52 | 10 | 15[7]  | 0  | 0 | 6  | 101 |

[1]PPE ($\eta$ sp/c = 0.38) made by Nippon Polyether Co., Ltd.
[2]"Sumitomo Noblen AW564" made by Sumitomo Chemical Co., Ltd.
[3]"Sumitomo Excelen CN1001" (0.90 g/cm$^3$) made by Sumitomo Chemical Co., Ltd.
[4]"Sumitomo Esprene E400" (propylene content = 32%, ML$_{1+4}$, 121° C. = 52) made by Sumitomo Chemical Co., Ltd.
[5]"Craton GX-1701" (styrene-propylene block copolymer) made by Shell Chemical Co., Ltd.
[6]Styrene-modified ethylene propylene rubber
[7]"Diene 35A" made by Asahi Chemical Industry Co., Ltd.

EFFECT OF THE INVENTION

As mentioned above, the present invention provides a thermoplastic resin composition which exhibits not only good moldability but also well-balanced physical properties. The resin composition can easily be processed into molded articles by injection molding and extrusion molding which are normally used for polyphenylene ether-based thermoplastic resin compositions. The resulting molded articles have outstanding impact resistance, heat resistance, hardness, appearance, and smoothness. In addition, the present invention provides a process for producing the thermoplastic resin composition just mentioned above.

What is claimed is:

1. A thermoplastic resin composition which comprises:
   (a) a polyphenylene ether resin or a polyphenylene ether-containing resin composition,
   (b) a polypropylene grafted with a styrene-based monomer, a propylene copolymer grafted with a styrene-based monomer or a mixture thereof
   (c) an ethylene-α-olefin copolymer grafted with a styrene-based monomer, said ethylene-α-olefin copolymer having a density of 0.85–0.91 g/cm$^3$ and a maximum melting peak temperature of 100° C. and above measured with a differential scanning calorimeter (DSC).

2. A thermoplastic resin composition as claimed in claim 1 which further comprises at least one type of rubbery substance (d).

3. A thermoplastic resin composition as claimed in claim 1, which comprises (c) 2–100 parts by weight of the ethylene-α-olefin copolymer grafted with a styrene-based monomer, said ethylene-α-olefin copolymer having a density of 0.85–0.91 g/cm$^3$ and a maximum melting peak temperature of 100° C. or above, as measured with a differential scanning calorimeter (DSC) per 100 parts by weight of a composition of
   (a) 98–2 wt% of the polyphenylene ether resin, and
   (b) 2–98 wt% of the polypropylene grafted with a styrene-based monomer, a propylene copolymer grafted with a styrene-based monomer or a mixture thereof.

4. A thermoplastic resin composition as claimed in claim 2, which is formed by mixing 100 parts by weight of a preblend composed of components (a), (b), and (c) with 0–50 parts by weight of the rubbery substance (d).

5. A thermoplastic resin composition as claimed in claim 1, wherein the polyphenylene ether (a) is obtained by the oxidative coupling of one or more than one type of phenol represented by the following general formula:

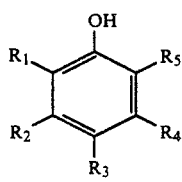

wherein $R_1$, $R_2$, $R_3$, $R_4$, and $R_5$ each represents hydrogen, a halogen, a hydrocarbon group, a substituted hydrocarbon group, a hydrocarbyloxy group or a substituted hydrocarbyloxy group, wherein at least one of $R_1$–$R_5$ being hydrogen.

6. A process for producing a thermoplastic resin composition which comprises mixing a preblend composed of:
   (a') a polyphenylene ether resin or a polyphenylene ether-containing resin composition,
   (b') a polypropylene, a propylene copolymer or a mixture thereof; and
   (c') an ethylene-α-olefin copolymer having a density of 0.85–0.91 g/cm$^3$ and a maximum melting peak temperature of 100° C. and above measured with a differential scanning calorimeter (DSC)
with a styrene-based monomer and an organic peroxide, and followed by kneading with heating.

7. A process for producing a thermoplastic resin composition as claimed in claim 6, wherein the preblend before kneading contains a rubbery substance (d').

8. A process for producing a thermoplastic resin composition as claimed in claim 6, wherein the preblend is composed of 100 parts by weight in total of
   (a') polyphenylene ether resin or a polyphenylene ether-containing resin composition (98–2 wt%), and
   (b') a polypropylene, a propylene copolymer (2–98 wt%), or a mixture thereof and
   (c') 2–100 parts by weight of an ethylene-α-olefin copolymer having a density of 0.85–0.91 g/cm$^3$ and a maximum melting peak temperature of 100° C. and above measured with a differential scanning calorimeter (DSC);
the styrene-based monomer is added in an amount of 1–100 parts by weight for 100 parts by weight of the preblend composed of the components (a'), (b'), and (c'); the organic peroxide is added in an amount of 0.01–5 parts by weight for 100 parts by weight of the styrene-based monomer; and the kneading is carried out at temperatures in the range of 180°–350° C.

9. A process for producing a thermoplastic resin composition as claimed in claim 6, wherein the polyphenylene ether (a') is obtained by the oxidative coupling of one or more than on type of phenol represented by the following general formula:

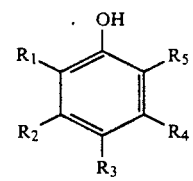

where $R_1$, $R_2$, $R_3$, $R_4$, and $R_5$ each represents hydrogen, a halogen, a hydrocarbon group, a substituted hydrocarbon group, a hydrocarbyloxy group or a substituted hydrocarbyloxy group, wherein at least one of $R_1$–$R_5$ being hydrogen.

10. A process for producing a thermoplastic resin composition as claimed in claim 8, wherein 0–50 parts by weight of a rubbery substance (d') is added to 100 parts by weight of the total amount of the components (a'), (b'), and (c').

11. An automotive part comprised of the thermoplastic resin composition according to claim 1 or 2.

12. An automotive part according to claim 11, which is a part selected from the group consisting of a bumper, an instrument panel, a fender, trim, a door panel, a wheel cover, a side protector, garnish, a trunk lid, a hood, and a roof.

* * * * *